(12) United States Patent
Lykov

(10) Patent No.: US 9,630,685 B2
(45) Date of Patent: Apr. 25, 2017

(54) FLOATING CONSTRUCTION

(71) Applicant: WATERBOX OY, Lahti (FI)

(72) Inventor: Evgeny Lykov, Metsakyla (FI)

(73) Assignee: WATERBOX OY, Lahti (FI)

(*) Notice: Subject to any disclaimer, the term of this patent is extended or adjusted under 35 U.S.C. 154(b) by 0 days.

(21) Appl. No.: 14/432,444

(22) PCT Filed: Oct. 2, 2012

(86) PCT No.: PCT/FI2012/050942
§ 371 (c)(1),
(2) Date: Mar. 30, 2015

(87) PCT Pub. No.: WO2014/053693
PCT Pub. Date: Apr. 10, 2014

(65) Prior Publication Data
US 2015/0225042 A1    Aug. 13, 2015

(51) Int. Cl.
*B63H 5/125*    (2006.01)
*B63B 29/18*    (2006.01)
*A63J 99/00*    (2009.01)
*B63B 35/73*    (2006.01)
*A63G 31/00*    (2006.01)
(Continued)

(52) U.S. Cl.
CPC ............ *B63B 29/18* (2013.01); *A63G 31/007* (2013.01); *A63J 99/00* (2013.01); *B63B 21/16* (2013.01); *B63B 21/50* (2013.01); *B63B 21/56* (2013.01); *B63B 29/02* (2013.01); *B63B 35/44* (2013.01); *B63B 35/53* (2013.01); *B63B 35/73* (2013.01); *B63C 11/49* (2013.01); *B63H 5/125* (2013.01); *B63B 2035/004* (2013.01); *B63B 2035/4426* (2013.01)

(58) Field of Classification Search
CPC ...................................................... B63C 11/49
See application file for complete search history.

(56) References Cited

U.S. PATENT DOCUMENTS 3,240,186 A * 3/1966 Curzon Dobell .... A01K 61/007
                                                     114/66
4,854,256 A    8/1989 Hayashi
(Continued)

FOREIGN PATENT DOCUMENTS

DE        3524418 A1    1/1987
JP        S61-68990 U   5/1986
(Continued)

OTHER PUBLICATIONS

International Search Report, dated Mar. 20, 2013, from corresponding PCT application.
(Continued)

*Primary Examiner* — Edwin Swinehart
(74) *Attorney, Agent, or Firm* — Young & Thompson

(57) ABSTRACT

A floating construction (1, 11) includes a vessel (2, 12) partially or fully filled with water and with transparent walls or with walls including transparent sections, and space (3, 5, 6) provided around or partially around the vessel, where the vessel includes at least one opening allowing the surrounding water to enter into the vessel, wherein the space (3, 5, 6) provided around the vessel (2, 12) is enclosed to provide interior observation area for activities taking place inside the vessel.

13 Claims, 3 Drawing Sheets

(51) Int. Cl.
  *B63B 21/16* (2006.01)
  *B63B 21/50* (2006.01)
  *B63B 21/56* (2006.01)
  *B63B 29/02* (2006.01)
  *B63B 35/53* (2006.01)
  *B63C 11/49* (2006.01)
  *B63B 35/44* (2006.01)
  *B63B 35/00* (2006.01)

(56) References Cited

U.S. PATENT DOCUMENTS

| | | | | |
|---|---|---|---|---|
| 5,265,549 | A | * 11/1993 | Cernier | B63H 11/08 |
| | | | | 114/258 |
| 2003/0164132 | A1 | 9/2003 | Wipermann | |
| 2014/0017649 | A1* | 1/2014 | Lykov | A63B 69/00 |
| | | | | 434/247 |

FOREIGN PATENT DOCUMENTS

| | | |
|---|---|---|
| JP | S63-149286 A | 6/1988 |
| JP | H06-344977 A | 12/1994 |
| JP | 2001-301686 A | 10/2001 |
| WO | 0172583 A1 | 10/2001 |
| WO | 2014/009591 A1 | 1/2014 |

OTHER PUBLICATIONS

Japanese Office Action, dated May 17, 2016, from corresponding Japanese Application No. 2015-535073.

* cited by examiner

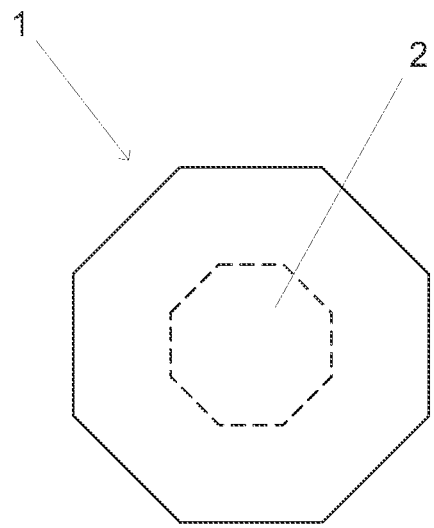
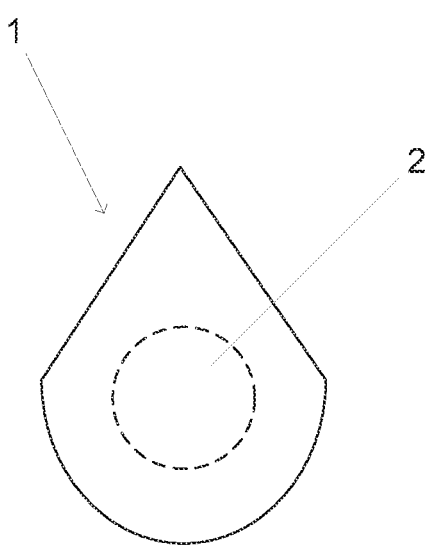
FIG. 3A  FIG. 3B
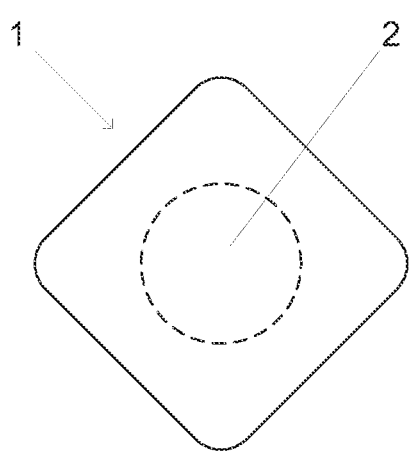
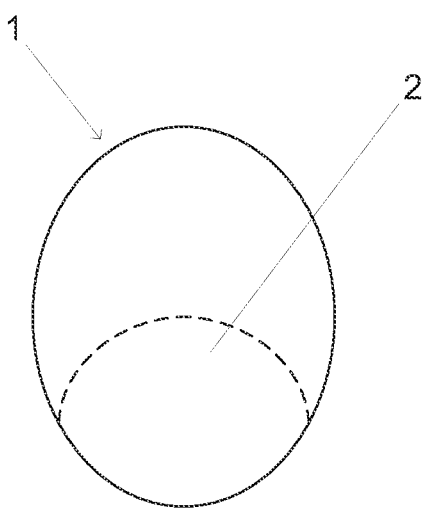
FIG. 3C  FIG. 3D

FLOATING CONSTRUCTION

The present invention relates to a floating construction, that comprises space for people, and a vessel or container fully or partially filled with water, which vessel or container comprises at least partially transparent walls.

Patent application PCT/FI2012/050726 discloses an apparatus for underwater activities, which apparatus comprises a vessel partially or fully filled with water with one or more open openings for entering the vessel, where the lower portion of the vessel together with the open openings for entering the vessel are located below surface level of a body of water. The walls of the vessel are transparent, or the walls comprise sections that are transparent, which allows people to observe activities taking place inside the vessel from outside of the vessel. This application also discloses an embodiment, where the vessel is connected to a floating platform to provide a floating construction. Further, this application also shortly mentions a possibility for providing room for spectators inside the walls of the vessel.

The present invention provides a floating construction that comprises a vessel partially or fully filled with water, with transparent walls or with walls comprising transparent section, and with at least one opening allowing the water surrounding the floating construction to enter the vessel. In the floating construction there is space provided around or partially around the vessel for people to observe activities taking place inside the vessel, which space is enclosed to provide interior observation area.

In the context of the present invention the partial filling of the vessel means situation where there is provided an airspace between the water surface and the top surface of the vessel. However, the water surface level in the partially filled vessel needs to be significantly higher that the surface level of the water surrounding the floating construction in order to provide sufficiently large body of water inside the vessel for activities taking place inside the vessel that can be observed through the walls of the vessel.

In the present invention the enclosed space around or partially around the vessel includes advantageously substantially the whole structure of the floating construction, so that the vessel partially or fully filled with water is located inside or on the edge of the structure of the floating construction, and the opening of the vessel is on the bottom surface of the vessel, and thus also on the bottom surface of the floating construction.

The enclosed space of the floating construction of the present invention advantageously comprises plurality of floors or decks, and the vessel extends vertically through plurality of these floors. Advantageously the vessel extends though all of the floors or decks of the floating structure, so that the top surface of the vessel is substantially at the same level than the roof of the floating structure.

The vessel also advantageously comprises a horizontally extending floor structure located inside the vessel and connected to the walls of the vessel. The floor structure may be connected to the walls of the vessel so that the water and/or persons may move from one side of the floor structure to other through areas located at the edges of the floor structure. Alternatively the floor structure may be connected watertightly to the walls of the vessel. The horizontally extending floor structure may also be vertically adjustable. This horizontally extending floor structure may be used to define different kinds of playing fields inside the vessel, for example.

In the present invention the walls of the vessel, especially the vertically extending walls, are advantageously provided with plurality of air locks for entering and exiting the water inside the vessel. For example, in the floating construction provided with several floors, each or many of the floors can have one or more air locks for accessing the water in the vessel.

The enclosed space of the floating construction according to the invention can also advantageously be equipped with plurality of living quarters for providing rooms for overnight stay to people, so that the floating construction may operate as a hotel for example. Further, the enclosed space may also be equipped with premises for providing food, drinks and entertainment, such as restaurants, bars, theatres, movie theatres, for example.

For moving the floating construction on water, the floating construction is advantageously provided with a suitable propulsion system. The propulsion system may comprise one or more propellers with engines for rotating them. The propulsion system may comprise one or more azimuth-type thrusters, for example. Alternatively the floating construction may be moved on water with tugboats for example.

The floating construction is also advantageously equipped with anchoring system for securing the construction at a suitable place or location on water. The anchoring system may comprise one or more anchors connected to the floating structure with wires or chains, and winches for raising and lowering the anchors. Alternatively the anchoring system may comprise fixed anchoring bases on bottom of a larger body of water, such as lake, sea, ocean or river for example, which anchoring base or bases may be used for securing the floating construction.

For moving people to and from the floating construction, the roof of the floating construction may be equipped with an airstrip and/or a helipad. Alternatively or additionally the floating structure may be equipped with fixed or detachable docking facility for allowing passengers to enter and exit the floating construction.

The features defining a floating construction according to the invention are presented more precisely in claim 1. Other advantageous embodiments and features are presented in dependent claims.

Exemplifying embodiment of the invention and its advantages are explained in greater detail below in the sense of example and with reference to accompanying drawings, where:

FIGS. 3A-3D shows schematically top views of embodiments of floating constructions according to the invention.

FIG. 1 shows schematically a cross-sectional side view of an embodiment of a floating construction 1 according to the invention.

Figure 1:
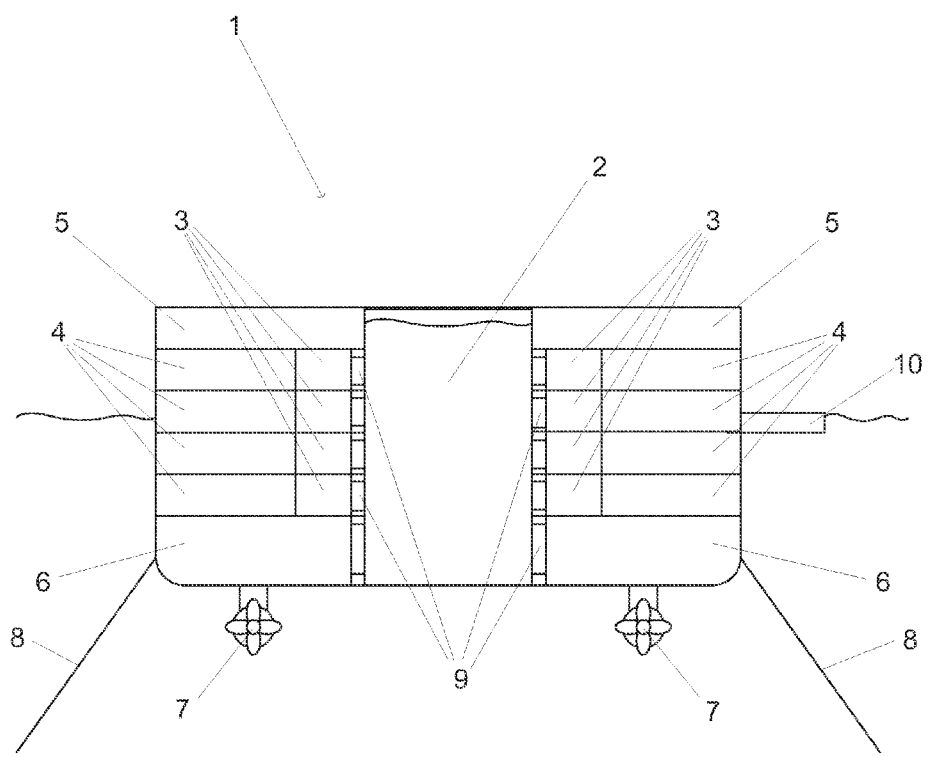
FIG. 1 shows schematically a cross-sectional side view of an embodiment of a floating construction according to the invention.

The floating construction 1 comprises a vessel 2 located inside the structure of the floating construction, which vessel is surrounded by enclosed space comprising plurality of floors or decks.

At least some of the floors of the floating construction 1 comprise space 3 around and next to the vessel 2, from where the activities taking place inside the vessel can be observed through transparent, or transparent portions of, walls of the vessel. These spaces 3 can be equipped with chairs or other seating arrangements, like in theatres or movie theatres for examples.

At least some of the floors of the floating construction 1 also comprise living quarters 4 in the form of hotel rooms, for example, where the passengers or visitors can stay overnight.

The top floor 5 of the floating construction 1 is equipped with restaurants, bars, casinos and other facilities taking care of the needs of the visitors or passengers.

The bottom floor 6 of the floating construction 1 is equipped with required machinery to keep the floating construction in operating condition, including power and electricity generation, air conditioning and so on. The bottom floor is also provided with facilities required for providing different kinds underwater shows or sporting events inside the vessel 2.

From the bottom surfaces of the floating construction extends an azimuth propulsion arrangement 7 used to move and steer the floating construction on the water. The underwater portion of the floating construction 1 also includes anchoring system comprising anchoring wires or chains 8, which are used in anchoring the floating construction on the water.

The bottom of the vessel 2 is open to surrounding water in this embodiment and it is advantageously covered with removable net or grill structure to catch any dropped items inside the vessel and to prevent sea life to enter the vessel during shows, for example.

The vessel 2 or its surrounding structure is provided with suitable machinery for creating an under pressure or partial vacuum inside the vessel and with pumping machinery for pumping water inside the vessel, which are used for filling the vessel with water and setting the water surface level inside the vessel.

Further, in order to be able to fill the vessel 2 completely, the floating construction 1 comprises a system for adjusting the draft of the floating construction. This way the draft is increased when the vessel needs to be fully filled, and decreased when the floating construction is moved to a new location. The vessel 2 also includes suitable machinery for changing the air in the possible airspace between the water surface level and the top surface of the vessel.

The walls of the vessel 2 are provided with air locks 9, which allow entrance to and exit from the water inside the vessel.

The floating construction 1 is also equipped with fixed or detachable docking platform 10, which allows ships, boats, hydroplanes etc. to dock to the floating construction for transporting passengers and/or visitors to and from the floating construction. For transporting passengers and visitors, the level top surface or roof of the floating construction 1 can be equipped with airstrip or helipad.

Figure 2:
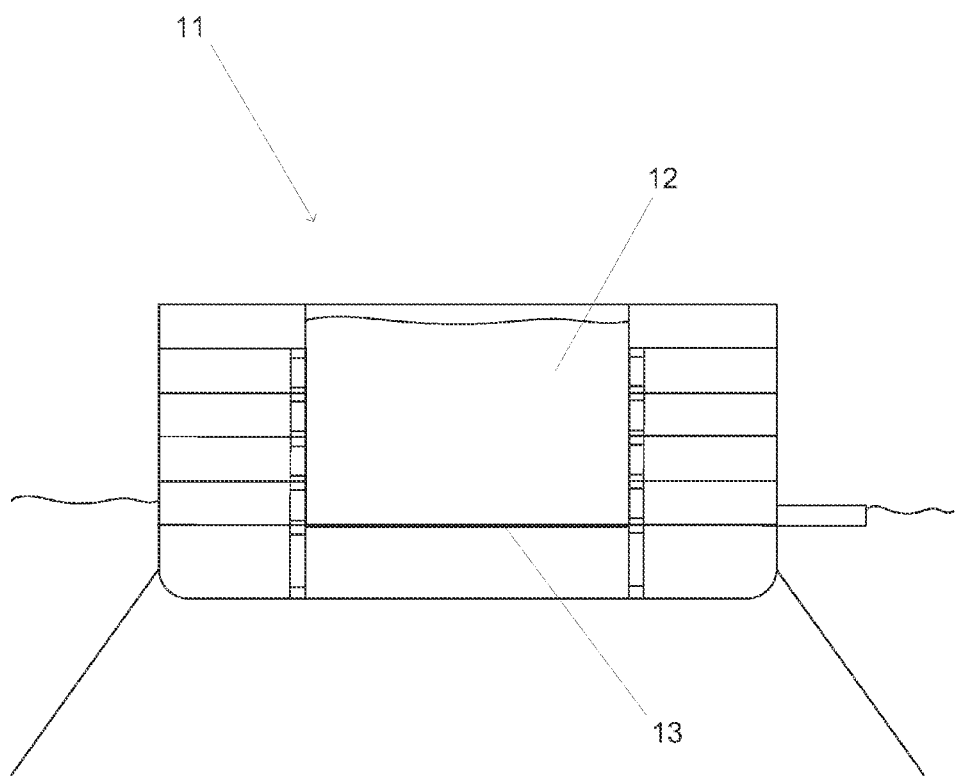
FIG. 2 shows schematically a cross-sectional side view of an alternative embodiment of a floating construction according to the invention.

In the embodiment of FIG. 2 the floating construction 11 comprises plurality of floors and a vessel 12 having an open bottom surface. In the vessel 12 is arranged a horizontally extending floor structure 13.

The floor structure 13 in this embodiment is connected watertighly to the vertical walls of the vessel 12. This type of arrangement removes the maximum height difference restriction between the surface level of the surrounding body of water and the surface level of the water inside the vessel 12 based on laws of physics. Further, the connection between the walls of the vessel 12 and the floor structure 12 is preferably vertically adjustable, so that the volume of the vessel above the floor structure can be adjusted to be suitable for different types of activities.

The watertight floor structure 13 in the present invention is advantageously removable or the watertightness of the floor structure is removable in suitable way, so that the inner part of the vessel 12 can be returned to a single entity.

Alternatively the floor structure can cover only portion of the cross-section of the vessel 12 and connected to the walls of the vessel only from certain places in order to be able to keep its position inside the vessel. In this type of arrangement water and people can move from one side of the horizontally extending floor structure to another through areas between the floor structure and the walls of the vessel, for example.

The floor structure inside the vessel 12 is advantageously used for defining a suitable playing field for the game taking place inside the vessel.

The floating construction 11 does not have any own propulsion system in this embodiment, whereby the floating construction is towed by tugboats to different locations on water, and anchored to keep its position.

FIGS. 3A-3D shows schematically examples of different forms and shapes for the floating construction 1 viewed from top, where the outline of the vessel 2 inside the floating construction is shown in dashed line. In FIG. 3D is shown an example, where part of the vessels 2 wall forms portion of the outer surface of the floating construction 1.

The specific exemplifying embodiments of the invention shown in figures and discussed above should not be construed as limiting. A person skilled in the art can amend and modify the exemplary floating construction described above in many evident ways within scope of the attached claims. Thus the invention is not limited merely to the embodiments described above.

The invention claimed is:

1. A floating construction comprising:
   an outer construction floating in surrounding outside water;
   a vessel at least partially filled with water and located within the outer construction,
   the vessel comprised of walls that are transparent or include transparent sections,
   the vessel further comprised of at least one opening that allows the water to enter into the vessel and at least partially fill the vessel; and
   an enclosed space located within the outer construction and provided at least partially around the vessel,
   wherein a surface level of the water in the vessel is significantly higher than a surface level of the surrounding outside water,
   wherein the enclosed space provides an interior observation area for activities taking place inside the vessel, and
   wherein the vessel comprises a horizontally extending floor structure located inside the vessel and connected to the walls of the vessel.

2. The floating construction according to claim 1, wherein the enclosed space comprises a plurality of floors, and the vessel extends vertically through the plurality of floors.

3. The floating construction according to claim 1, wherein the floor structure is connected watertightly to the walls of the vessel.

4. The floating construction according to claim 1, wherein the walls of the vessel are provided with plurality of air locks for entering and exiting the water inside the vessel.

5. The floating construction according to claim 1, wherein the enclosed space comprises a plurality of living quarters.

6. The floating construction according to claim 1, wherein the enclosed space comprises premises for providing at least one of the group consisting of food, and entertainment.

7. The floating construction according to claim 1, further comprising an anchoring system for securing the construction on water.

8. The floating construction according to claim 1, further comprising a roof equipped with an airstrip.

9. The floating construction according to claim 1, further comprising a fixed or detachable docking facility for allowing passengers to enter and exit the floating construction.

10. The floating construction according to claim 2, wherein the floor structure is connected watertightly to the walls of the vessel.

11. The floating construction according to claim 2, wherein the walls of the vessel are provided with plurality of air locks for entering and exiting the water inside the vessel.

12. The floating construction according to claim 1, further comprising a roof equipped with a helipad.

13. The floating construction according to claim 1, further comprising a roof equipped with an airstrip and a helipad.

\* \* \* \* \*